(12) United States Patent
Leigh

(10) Patent No.: US 7,284,067 B2
(45) Date of Patent: Oct. 16, 2007

(54) METHOD FOR INTEGRATED LOAD BALANCING AMONG PEER SERVERS

(75) Inventor: Kevin B. Leigh, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 745 days.

(21) Appl. No.: 10/079,359

(22) Filed: Feb. 20, 2002

(65) Prior Publication Data

US 2003/0158940 A1   Aug. 21, 2003

(51) Int. Cl.
G06F 15/173 (2006.01)

(52) U.S. Cl. ...................... 709/238; 709/243

(58) Field of Classification Search .......... 709/227, 709/228, 238, 241, 243; 718/105
See application file for complete search history.

(56) References Cited

U.S. PATENT DOCUMENTS

| | | | | |
|---|---|---|---|---|
| 5,774,660 A * | 6/1998 | Brendel et al. | ............. | 709/201 |
| 5,774,668 A * | 6/1998 | Choquier et al. | ............ | 709/223 |
| 6,070,191 A * | 5/2000 | Narendran et al. | ......... | 709/226 |
| 6,101,616 A * | 8/2000 | Joubert et al. | ................ | 714/11 |
| 6,314,465 B1 * | 11/2001 | Paul et al. | .................. | 709/226 |
| 6,389,448 B1 * | 5/2002 | Primak et al. | ............... | 718/105 |
| 6,393,458 B1 * | 5/2002 | Gigliotti et al. | ............ | 709/203 |
| 6,725,253 B1 * | 4/2004 | Okano et al. | ................ | 709/203 |
| 6,728,748 B1 * | 4/2004 | Mangipudi et al. | ......... | 718/105 |
| 6,788,692 B1 * | 9/2004 | Boudreau et al. | ............ | 370/400 |
| 6,871,347 B2 * | 3/2005 | Hay | ........................... | 718/105 |
| 6,912,565 B1 * | 6/2005 | Powers et al. | ............... | 709/205 |
| 7,111,006 B2 * | 9/2006 | Vange et al. | ................... | 707/10 |
| 7,124,188 B2 * | 10/2006 | Mangipudi et al. | ......... | 709/226 |
| 2001/0034792 A1 * | 10/2001 | Swildens | ..................... | 709/238 |
| 2002/0049842 A1 * | 4/2002 | Huetsch et al. | ............. | 709/225 |

* cited by examiner

Primary Examiner—William Vaughn
Assistant Examiner—Joseph Maniwang

(57) ABSTRACT

A system for balancing network loads among a group of computer servers. A load balancing module is provided for each server and includes multiple network ports for receiving network traffic and coupling messages to its server or to another module. The interconnect map for the modules is automatically determined by a topology discovery system and maintained by a topology update system. Each module monitors the loading and health of its server and provides this information to the other modules. One or more master modules are directly connected to an external network and route received traffic to their own servers and other servers through other modules or a networking switch based on a priority system. The priority system may be based on dynamic conditions of server capacities and current loading.

40 Claims, 3 Drawing Sheets

METHOD FOR INTEGRATED LOAD BALANCING AMONG PEER SERVERS

CROSS-REFERENCE TO RELATED APPLICATIONS

Not applicable

STATEMENT REGARDING FEDERALLY SPONSORED RESEARCH OR DEVELOPMENT

Not applicable.

BACKGROUND OF THE INVENTION

1. Field of the Invention

The present invention generally relates to computer networks and servers and more particularly to a method for balancing network loads among multiple servers.

2. Background of the Invention

It is often desirable to connect multiple server computers to one or more external networks. Balancing of data traffic loads is often desirable when multiple servers are interconnected. Load balancing involves either distributing traffic to the servers so that all servers have approximately equal ratios of traffic volume to traffic handling capacity or, when traffic volume is low, reducing power to some servers while others handle the traffic. Traditionally, load balancing of a number of servers is achieved by connecting them to a dedicated, external load balancer box. Traditionally, algorithms programmed into the circuitry of a dedicated load balancing box can distribute traffic to the servers in a predefined manner that does not account for individual server load. Some load balancing boxes use the number of connections opened on each server as an indicator to assume load ratios on servers. More expensive and modem load balancing boxes interact with special software agents loaded on servers to collect rudimentary resource utilization information from the servers and use the information as feedback to distribute the loads. Traditionally, load balancer boxes are used to distribute loads to tens of servers. With computer technology advances, newer servers can handle many more loads than older ones, and new classes of servers have also emerged, e.g., web cache, streaming media cache, and virtual private network (VPN). These new classes of servers are typically used together in lower numbers, e.g., less than five. Therefore, using the same type of load balancer boxes for newer generations of servers is expensive, since a load balancer box can cost thousands or tens of thousands of dollars. In addition, the load balancing box represents a single point of failure. That is, if the box fails, all servers connected to it can lose connectivity to the external network or networks. To overcome this problem, more than one (redundant) load balancing box is typically used. This makes the cost problem even worse.

Alternatively, when only a few servers are to be deployed, low-cost load balancing can be achieved through a load balancing circuit board, such as a PCI card, installed in a computer, where the board has multiple network ports that connect to multiple servers. Load balancing circuit boards are typically designed for low-cost deployment, so they have simpler load balancing algorithms than the expensive load balancing boxes. Load balancing circuit boards available in the industry today, such as SonicWALL's Load Balancer—PCI card, typically use a "fan-out" configuration in which one board distributes loads to as many as four directly attached servers, but more servers can be attached by using additional hardware switches. To achieve redundancy, a primary board on one server can be coupled with a secondary board on another server in case of failure of the primary board.

It would be desirable to have a low-cost and scalable method of interconnecting multiple servers and connecting the server group to an external network or networks. A low-cost load balancing card can be designed to be resident within a server. Multiple load balancing cards can be connected in a daisy-chain configuration when there are only a few of them or to a non-load-balancing switch when there are several of them. In a daisy-chain configuration, a network connection is made to a first board, a second board is connected to the first, a third is connected to the second, and so on. In this configuration, if one board fails, the boards farther along the chain lose their connection to the network.

BRIEF SUMMARY OF THE INVENTION

A system for balancing external network loads among a group of computer servers includes a load balancing module attached to or integrated within each server. Each module includes a plurality of network ports. One or more master modules have network ports connected to external networks. All modules have network ports coupled to network ports of other modules to form an internal network through which each module communicates information concerning itself and its server to other modules and through which network messages may be routed to servers in the group.

In a preferred form, each master module routes or distributes received network messages to the servers based on a priority system or algorithm. The priority system may be an adaptive round-robin in which each message is initially routed to the next server in either a pre-assigned or server-capacity-weighted order. The order can later be dynamically adjusted based on current information concerning server loading, capacity (in case it is modified) and health.

In one preferred form, the system includes two master modules which receive redundant network traffic. One acts as a primary master and distributes traffic. The other is a standby master which monitors the health of the primary master and takes over the functions of the primary master in event of failure of the primary master, its server, or the network connection to the primary master.

BRIEF DESCRIPTION OF THE DRAWINGS

For a detailed description of the preferred embodiments of the invention, reference will now be made to the accompanying drawings.

NOTATION AND NOMENCLATURE

Figure 1A:
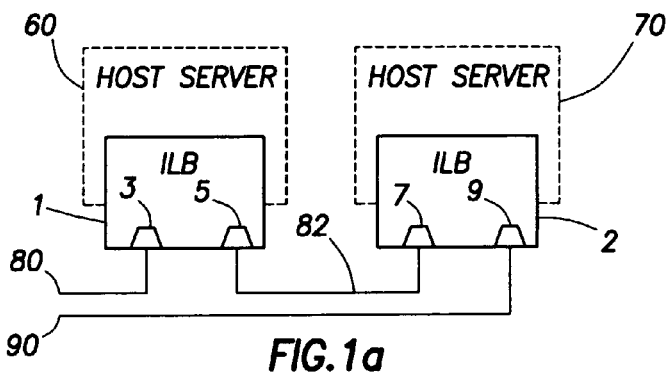
FIGS. 1(a) through 1(d) show schematic diagrams of embodiments having two through five servers interconnected through load balancing modules.

Certain terms are used throughout the following description and claims to refer to particular system components. As one skilled in the art will appreciate, components may be referred to by different names. This document does not intend to distinguish between components that differ in name, but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical or communicative connection. Thus, if a first device couples to a second device, that connection may be through a direct connection, or through an indirect connection via other devices and connections.

DETAILED DESCRIPTION OF THE PREFERRED EMBODIMENTS

The present invention relates to a method for connecting multiple computer servers to each other and to an external network or networks in an efficient, reliable, and cost-effective manner. The invention enables the servers to share information with their peers on data traffic volume and capacity and thus to efficiently balance loads among themselves. Load balancing involves either distributing traffic to the servers so that all servers have approximately equal ratios of traffic volume to traffic handling capacity, or when traffic volume is low, reducing or turning off power to some servers while others handle the traffic. Multiple data paths are provided among the servers and to any external networks. This redundancy of data paths allows connectivity to be maintained if a network connection is lost or if a server fails or is disconnected. Balancing of loads, redundancy of connections, and assurance of connectivity to other servers during failure or disconnection of one or more servers are achieved at a lower cost compared to existing techniques of server connection, especially when the number of servers is low, e.g., less than ten.

Load balancing functions can be provided by programmable hardware such as a field programmable gate array (FPGA), or by a firmware-implemented algorithm on a microprocessor. FPGAs or microprocessor logic and associated electronics are placed on a printed circuit card. The card is then connected to a server through a standard input/output interface such as PCI or USB. Alternatively, the algorithm can be programmed into an application specific integrated circuit (ASIC), which is then embedded on the server motherboard. A card or circuit using the load balancing algorithm is known as a load balancing module. Since a load balancing module is to be coupled to each server, it will be referred to as an Integrated Load Balancer (ILB). In this specification, a server with an ILB will be referred to as a participating server. In addition, two or more participating servers coupled via ILBs will be referred to as an internal network. Any network to which an internal network is coupled but which is not part of the internal network will be referred to as an external network.

An ILB typically has two or three ports for interconnection with external networks, other ILBs, or an off-the-shelf non-load-balancing switch. The multiple ports allow the ILBs to provide redundancy and load balancing functions. If only two servers are present, redundancy and load balancing can be provided with only two ports. Three ports are typically used for three or more servers.

However, if a non-load-balancing switch is used to make the connections within the internal network and the external network connections are coupled through the switch, then two ports can be used. The two ports can carry redundant traffic or one port can be used for inbound (to an ILB) traffic and another for outbound (from an ILB) traffic. An ILB still needs three ports for an external network to be directly coupled to the ILB.

ILBs can be used to configure the connections between servers and external networks in several different ways. First, two separate connections, a teamed or redundant pair, can be made to one external network. Second, single, non-teamed connections to multiple external networks can be made. Each of these scenarios will be described below. A third case, in which teamed connections are made to multiple external networks, is also possible but will not be described in this specification since its principles of operation should be apparent to those skilled in the art and familiar with the first two scenarios.

Figure 1B:
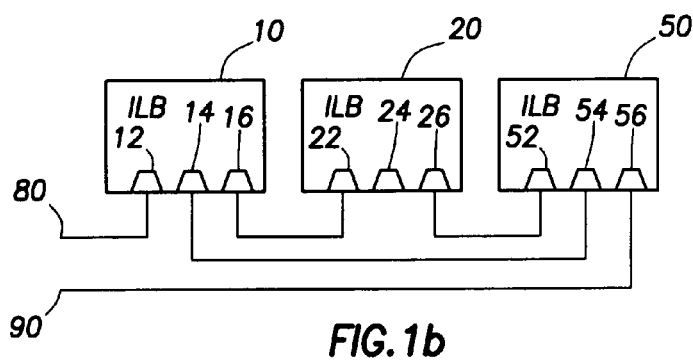
Figure 1C:
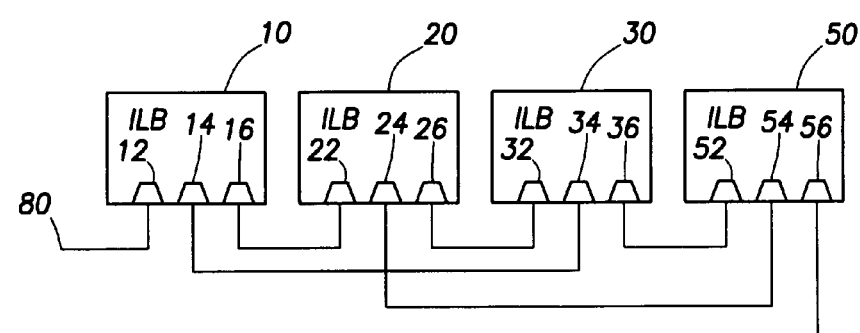
Figure 1D:
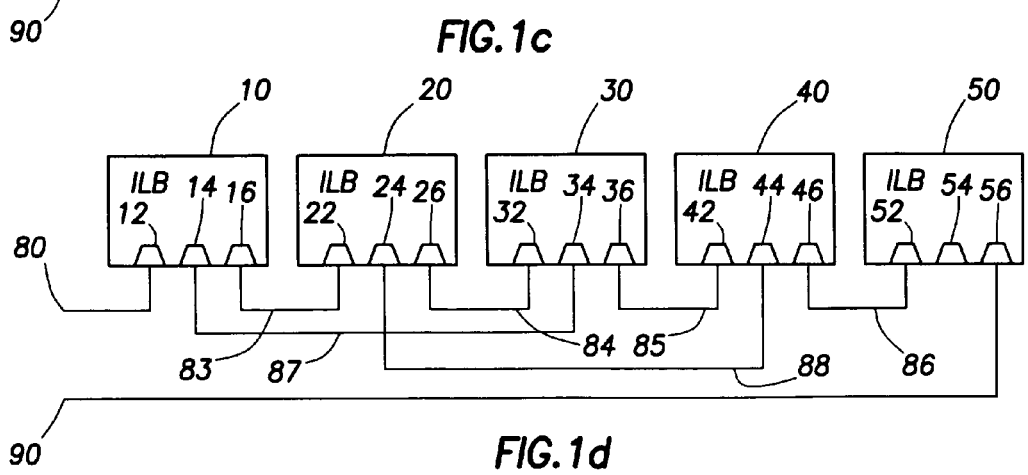

The first case, two redundant connections to the same external network, can best be understood by reference to the embodiments shown in FIGS. 1(a) through 1(d). Network segments 80 and 90 connect a single external network (not shown) to multiple servers through two ILBs. In FIG. 1(a), network segment 80 connects to ILB 1 and network segment 90 connects to ILB 2. In FIGS. 1(b), 1(c), and 1(d), network segment 80 connects to ILB 10 and network segment 90 connects to ILB 50. ILBs to which network segments directly connect are referred to as master ILBs. Other ILBs, such as ILB 20, ILB 30, and ILB 40 in FIG. 1(d), are referred to as slave ILBs. Both master ILBs receive all external network traffic, but, by default, only one master ILB is able to distribute loads to the participating servers. This ILB is referred to as the primary master. The other master ILB acts as a standby master. Under normal operating conditions, the primary master ILB will load balance the incoming workload. If the primary master ILB fails, the standby master ILB takes over the load balancing. Upon failure of both master ILBs, the entire cluster will become inoperative. The ILBs are either manually pre-configured with one being the primary master and the other the standby master or they can perform an automated initialization process in which they negotiate via a topology discovery algorithm (described below) to decide which is the primary and which is the secondary.

In FIG. 1(a), ILB 1 and ILB 2 are attached to server 60 and server 70, respectively. In FIGS. 1(b) through 1(d), the servers are no longer shown for simplicity, but each ILB should be understood as being attached to or integrated into a server. In FIG. 1(a), port 3 on ILB 1 and port 9 on ILB 2 are used to connect the external network to the servers 60 and 70, respectively. Port 5 on ILB 1 and port 7 on ILB 2 are used to connect ILB 1 and ILB 2 to each other via connection 82. Note that for FIGS. 1(b) through 1(d), each ILB has three ports. The ILBs are interconnected in a way that a failure or a removal of any one ILB will not break the interconnection chain of the remaining functional ILBs.

Referring to FIG. 1(a) and assuming that ILB 1 is the primary master, if server 60 fails, then ILB 1 will relinquish the primary mastership to ILB 2 and will become the standby master. If port 3 on ILB 1 fails, then ILB 1 will relinquish the primary mastership to ILB 2 and ILB 2 takes over in sequencing loads between the two servers 60 and 70. If ILB 1 fails in both ports, then there will be no load balancing and ILB 2 will send traffic only to server 70. Similarly, if ILB 2 fails in both ports, then there will be no load balancing and ILB 1 will send traffic only to server 60. If port 5 of ILB 1 or port 7 of ILB 2 fails, then there will be no load balancing. In this case, the ILBs are to be preconfigured to react, e.g., only primary master ILB 1 receives traffic from network segment 80, although port 9 of ILB 2 and server 70 are healthy. Because of the redundant network connections, even by physically removing the network connection to ILB 1 or ILB 2, the remaining ILB and the corresponding server will accept and respond to the network traffic.

In FIG. 1(a), assume that network segments 80 and 90 are teamed or redundant, that is, they carry the same external network traffic. Also assume that ILB 1 and ILB 2 have communicated over connection 82 during an initialization phase using the topology discovery algorithm and have established that ILB 1 is the primary master and ILB 2 is the standby master. During the normal data transfer phase, ILB 1 sends a message packet to ILB 2 at regular time intervals, notifying ILB 2 that ILB 1 is under normal operation and acting as the primary master. This message packet can be referred to as a heartbeat packet. The time interval between heartbeat packets is typically dependent on the network protocol and speed. If ILB 2 does not receive a heartbeat packet from ILB 1 at the regular interval, it assumes that ILB 1 cannot carry on the primary master role. ILB 2 then sends a "primary mastership take-over" message packet to ILB 1 and takes over the primary mastership. If ILB 1 is still operational, that is, if the failure of ILB 1 to maintain the regular heartbeat packet transmission interval was a temporary event, then ILB 1 will send a "still alive" packet to ILB 2. If ILB 2 receives the "still alive" packet from ILB 1, ILB 2 processes the data traffic received on port 9 from network segment 90, performs load balancing of the traffic between server 60 and server 70, and sends a heartbeat packet to ILB 1 on connection 82. If ILB 2 does not receive a "still alive" packet from ILB 1 after a predetermined time interval since taking over the primary mastership, then ILB 2 assumes that ILB 1 has failed and sends all the loads to server 70. ILB 2 can be implemented to notify the network administrator of the ILB 1 failure event.

ILBs will follow one of three protocols in balancing network loads, namely threshold-based, adaptive, or zone-based load balancing. For all load balancing protocols, each ILB receives information regarding the current workload index of its corresponding host server. For threshold-based load balancing, each ILB also receives information regarding the workload threshold of its corresponding host server. The workload index typically comprises factors such as the data traffic volume and the utilization level of resources such as CPU, memory, or storage. Workload threshold is a watermark of workload index. A server may have multiple thresholds for the workload, such as low, medium, and high. For example, CPU utilization alone may be used as a workload threshold and the utilizations of 20%, 50%, and 80% may be defined as low, medium, and high. Each host server sends its workload threshold and current workload index information to its corresponding ILB during the automated initialization process and upon certain conditions, such as when the information changes are significant enough, e.g., the workload index changes by a predetermined amount (defined by the ILB design engineers or the system administrators, e.g., 10%); when a predetermined time interval expires (also defined by the ILB design engineers or the system administrators, e.g., every 5 seconds); or when a combination of these two conditions occurs. The primary master ILB decides which ILB, including itself, to send the incoming network load to, based on a priority system that will depend on the chosen load balancing protocol. The priority system establishes the order in which the primary master ILB distributes network loads to the ILBs. Each load balancing protocol defines methods to exchange workload threshold information and current workload indices among the ILBs.

In simple threshold-based load balancing, the primary master ILB directs the incoming loads to a chosen ILB until the workload threshold is reached for the chosen ILB's corresponding host server. At this point, the primary master ILB directs the incoming load to the next chosen ILB. For example, in FIG. 1(a), assume ILB 1 is the primary master. It receives all the incoming loads from network segment 80 until the CPU utilization of host server 60 reaches its workload threshold. At this point, ILB 1 directs the incoming loads on network segment 80 to ILB 2, via port 5, connection 82, and port 7. ILB 2 then forwards the loads to its host server 70. Loads will continue to be sent to server 70 until the CPU utilization of server 70 reaches its workload threshold. The fact that server 70 has reached its workload threshold is communicated from ILB 2 to ILB 1, and ILB 1 again directs the incoming loads from network segment 80 to its host server 60, which has a lower load by that time. The simple threshold-based load balancing method automatically takes care of imbalances in the capacity of the servers. A higher capacity server will have higher processing (or storage) capacity for the same threshold, e.g., 20% CPU utilization of a dual-processor host can do much more work than 20% CPU utilization of a single-processor host.

In adaptive load balancing, the primary master ILB distributes the incoming network traffic to the ILBs sequentially, based on the workload indices of the participating servers. Again, workload indices may include factors such as data traffic volume and server capacity. The workload threshold described for threshold-based load balancing is a relative value, since the actual processing or storage capacity for a given threshold depends on the maximum capacity of the server. For adaptive load balancing, a workload index ratio among the servers rather than a relative threshold percentage is used. For example, for two servers where one has twice the processing power of the other, instead of simply defining a 20% CPU utilization for the workload thresholds of the servers, a workload index ratio of 2 to 1 can be given to the servers. It should be noted that hardware configurations can be changed dynamically on modem servers, e.g., more memory and disks can be added or removed without interrupting server operation. Some servers may be disconnected from the internal network for maintenance or due to failure. Some servers may be added to the internal network. Consequently, the workload index ratio among the servers may be changed, and the master ILBs need to adapt to these changes as well. Similar to the threshold-based load balancing, the workload index information is loaded on an ILB by its attached host server during the automated initialization process. In addition, the workload index information for the participating host servers is exchanged among the ILBs when the information changes are significant enough, e.g., the workload index changes by a predetermined amount (defined by the ILB design engineers or the system administrators, e.g., 10%); when a predetermined time interval expires (also defined by the ILB design engineers or the system administrators, e.g., every 5 seconds); or when a combination of these two conditions occurs.

If ILBs 10, 20, and 50 in FIG. 1(b) use adaptive load balancing and if their corresponding host servers have similar workload indices, then the order in which network traffic is distributed to the servers can be a simple round-robin sequence, such as ILB 10, 20, 50, 10, 20, 50, and so on. If the corresponding servers have disparate workload indices, then the sequencing order may have some repeating ILBs. For example, if the servers associated with ILBs 10, 20, and 50 have workload index ratios of 2:1:3, respectively, then the sequence order will be ILB 10, 10, 20, 50, 50, 50, 10, 10, 20, 50, 50, 50, and so on. Note that the ILBs 10, 20, and 50 have two, one, and three loads, respectively, which is the same ratio as their workload index of 2:1:3.

In zone-based load balancing, as in the two load balancing methods just discussed, multiple primary master ILBs, each having an external network connection, distribute network loads to other ILBs with associated host servers. However, with zone-based load balancing, a primary master ILB typically sends loads only to ILBs within its zone and sends loads to ILBs in other zones only when the ILBs within its zone meet a predefined saturation level. A zone can be defined to consist of a primary master ILB and one or more slave ILBs. A primary master ILB can be the primary master of only one zone. A slave ILB can belong to more than one zone. Although zone definition can be done automatically, manually defining zones during ILB installation is simpler. Zone-based load balancing is a preferred load balancing method when about ten or more ILBs are present in a multi-server network.

The four-ILB embodiment shown in FIG. 1(c) can be used as an example to describe the zone-based load balancing method. Assume that ILBs 10 and 20 belong to zone-1 and ILBs 30 and 50 belong to zone-2 and that ILBs 10 and 50 are the primary master ILBs for their respective zones. Simpler load-balancing algorithms, such as a basic round-robin method, may be used when the slave ILBs do not overlap across the zones. In the example of FIG. 1(c), slave ILB 20 is in zone-1 only and slave ILB 30 is in zone-2 only, although it is possible to assign ILB 20 and ILB 30 to be in both zone-1 and zone-2. A primary master ILB, e.g., ILB 10, can collaborate with another primary master ILB, e.g., ILB 50, for load sharing. Each primary master ILB has its own zone as its primary zone and the collaborating zone as its secondary zone. A primary master ILB may decide to cross the zone boundaries and send some of its load to the servers in another zone based on based on factors such as its host server's workload index, network data traffic level, server health, and ILB health. "Server health" constitutes functional statuses on the server host's critical subsystem components, such as CPU(s), cache memory, system memory, and disks. "ILB health" constitutes functional statuses on the ILB's components, such as processors, memory buffers, ASICs, and FPGAs.

As an example of zone boundary crossing, in FIG. 1(c), after primary master ILB 10 has distributed the incoming load from network segment 80 to a predefined saturation level on the host servers associated with ILB 10 and ILB 20 in zone-1, ILB 10 may interrogate the other primary master, ILB 50 in zone-2, to possibly accept future incoming loads on network segment 80. If ILB 50 acknowledges the load shedding request from ILB 10, then ILB 50 provides ILB 10 with a list of ILBs that can accept the load and with the load-shedding conditions. The load-shedding conditions may include information such as absolute time interval, load-shed check timer value, and number of loads. An example of "absolute time interval" is a wall-clock time interval preset by system administrators based on the known load condition, such as during the first two hours of every weekday, or every business day at lunch hours. An example of "load-shed check timer value" is a number of hours or minutes, chosen by system administrators, to be set in a register and counted down. This timer value can be set at the time when a load reaches a predefined load index threshold or it can be set periodically. When the timer value has counted down, the corresponding ILB will check the load condition with respect to its resource capacity to determine whether or not it should notify the primary master ILB (if it is not one itself) to redirect the load to another ILB. If ILB 10 sheds its load while complying with the load-shedding conditions, it will stop the load-shedding activity upon a load-shed-abort signal from ILB 50. ILB 50 may issue this load-shed-abort signal to ILB 10 when the servers whose loads are being shed fall below a predefined resource saturation threshold.

The three load balancing methods described above can be used separately or in conjunction. There is only one "zone" in the threshold-based and adaptive load balancing methods. In zone-based load balancing, there is more than one zone. Within each zone, threshold-based or adaptive load balancing can be used.

Figure 2:
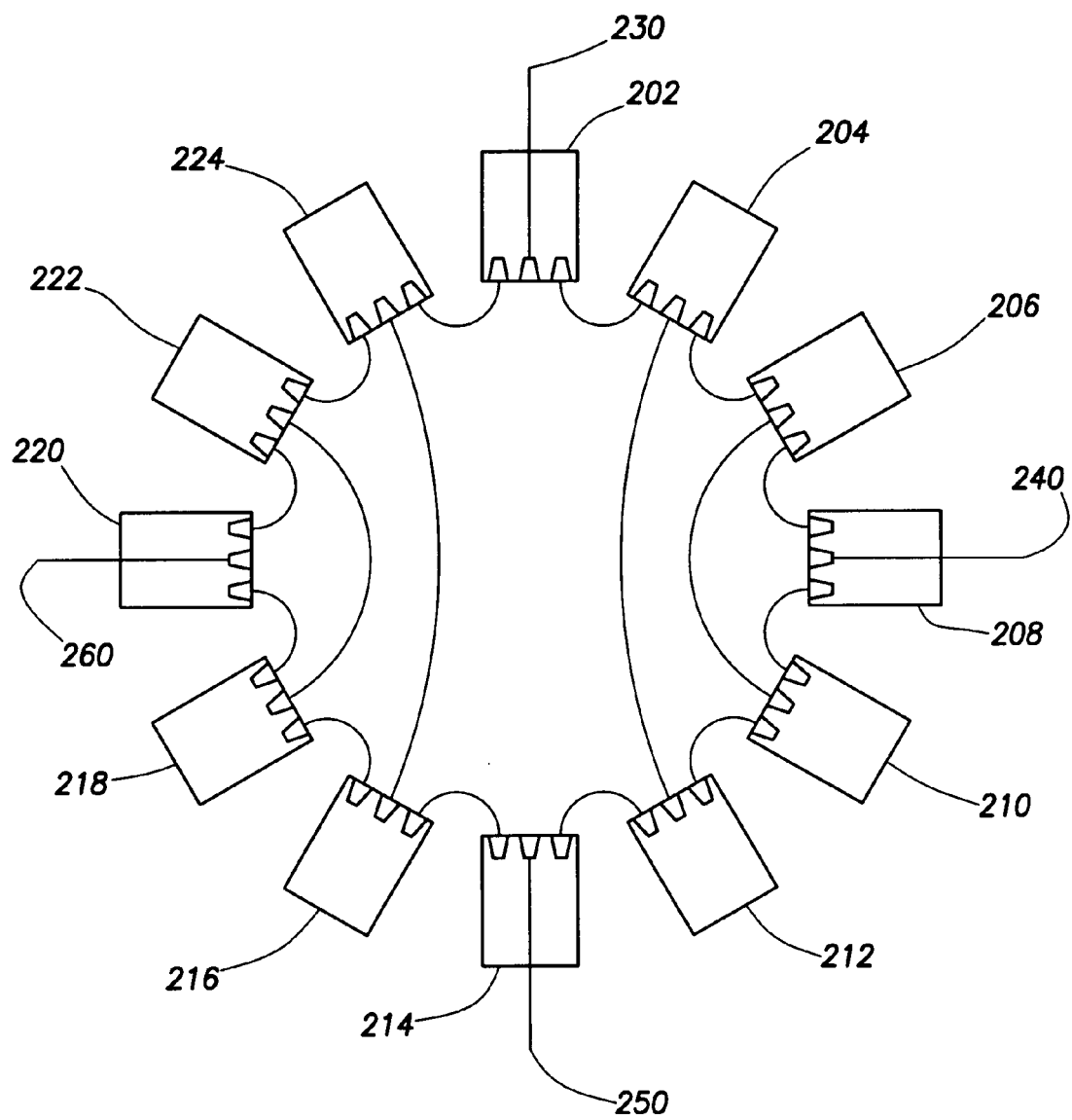
FIG. 2 shows a schematic diagram of another configuration for interconnecting multiple servers through load balancing modules.

FIG. 2 depicts another configuration for using load balancing modules to connect multiple servers in an internal network and connect the servers to multiple external networks. Twelve ILBs 202 through 224 are connected to four external networks through connections 230, 240, 250, and 260. FIGS. 1(b) through 1(d) and FIG. 2 demonstrate that the ILBs can be interconnected to provide redundant paths from any ILB to any other ILB. It is preferable to interconnect the ILBs in a way that the number of hops, or the number of intermediate ILBs to go through, is minimum for the ILBs in an internal network. The number of hops can vary based on the load balancing algorithm, such as threshold-based, adaptive, or zone-based.

While one or more ILBs in any given internal network may be designated as a master, every ILB contains sufficient intelligence to route incoming network traffic and preferably sufficient intelligence to assume the role of a master. During initialization, every ILB learns the interconnection pattern for all ILBs in the internal network. This allows a master to route a load to a particular ILB with the fewest hops. If the target ILB is directly connected to the master, the load will be sent over the direct connection. If the target ILB is not directly connected, the master knows the shortest path, that is, the path which requires the fewest hops through intermediate ILBs. When an intermediate ILB receives a load directed to another ILB, it likewise knows the shortest path to the target ILB and resends the load over the shortest path. For example, in FIG. 1(d), if ILB 10 is the primary master, it can route loads directly to ILBs 20 and 30 and can route loads to ILB 40 with one hop through either ILB 20 or 30. For ILB 10 to route a load to ILB 50, two hops are required, a first hop through either ILB 20 or 30 and a second hop through ILB 40. ILBs 20 and 30 each know that if they receive a load targeted for ILB 50, it should be sent to ILB 40 for resending to ILB 50.

In another mode of connection of multiple servers to external networks through the use of ILBs, multiple primary master ILBs can be used to connect to multiple external networks. When there are multiple primary master ILBs, the primary and secondary masterships are either manually pre-configured or configured during the initial setup phase via a topology discovery algorithm. During the operation phase, there will be times when the primary mastership needs to be handed over from the existing primary master ILB to the standby master ILB.

Referring to the embodiments in FIGS. 1(a) through 1(d), assume that network segments 80 and 90 are not redundant connections to a single external network but are connections to independent external networks carrying different traffic. For a two-server case as shown in FIG. 1(a), both ILB 1 and ILB 2 can be configured to be primary master ILBs. Each ILB handles the load on the corresponding port 3 and 9. If one ILB becomes unable to accept further data traffic, for example, if its corresponding host is saturated or has failed, it attempts to send its load to the other ILB. For example, if server 60 becomes saturated, ILB 1 will no longer direct traffic from port 3 to server 60. Instead, ILB 1 will direct traffic from port 3 to port 5. Traffic then flows from port 5 on ILB 1 to port 7 on ILB 2 via connection 82. ILB 2 then sends to server 70 the traffic coming in from the two external networks connected to network segments 80 and 90.

For the multi-server cases shown in FIGS. 1(b) through 1(d), the primary masters are ILB 10 and ILB 50. If the server connected to ILB 10 fails, then the incoming workload on network segment 80 is bypassed to ILB 20, via ports 12 and 16. The bypassing can be achieved by retransmitting the packets between these two ports 12 and 16, or by physically shunting (i.e., short-circuiting) the two ports 12 and 16, so that the external network connecting to port 12 is now electrically connected to port 22 on ILB 20 via port 16, bypassing ILB 10 completely. Either way, ILB 10 will become a traffic bridge. If the host server associated with a primary master ILB, e.g., ILB 10, is saturated rather than failed, then the bypassing will be temporary, and the ILB will maintain its primary mastership by sending the heartbeat packet to other ILBs. If the server associated with a primary master ILB fails, then the primary master ILB can either maintain its primary mastership or communicate with the other ILBs to designate the next primary master.

In an embodiment of the invention, an ILB can have a battery backup. If such an ILB is disconnected from its host server, and is thus disconnected from its normal source of power, the battery backup allows the ILB to continue its load balancing functions. For example, if a failure occurs in a server, the ILB coupled to the server typically can still receive power from the server and can continue to function. However, if the failed server is removed in order to be replaced, the ILB will lose power and functionality unless the ILB has a battery backup. With a battery backup, a primary master ILB can continue to function as primary master even when disconnected from the server. The failed server could be removed and a new server could be coupled to the primary master ILB with no loss of load balancing capability. The primary master ILB remains connected to the other ILBs at all times under this scenario.

Alternatively, a primary master ILB coupled to a failed host server may be disconnected from the internal network of ILBs. In this case, the primary master ILB communicates with the other ILBs to designate the next primary master ILB before it is disconnected. The primary master ILB coupled to a failed host server can signal an operator or a system administrator, e.g., by flashing a LED or displaying a message on a LCD panel, that it can be physically disconnected, after the next primary master ILB has been selected. The process of selecting the next primary master includes each ILB voting itself to be eligible to receive primary mastership. An ILB is not eligible to receive primary mastership if it is already a primary master ILB. ILBs can send their workload indices, such as capacity information, to the primary master ILB coupled to the failed host server and the next primary master ILB may be selected based on the ILB with the most abundant resources. In FIG. 1(b), if the host server associated with ILB 10 fails, then ILB 20 will become the next primary master ILB, since ILB 50 is already a primary master with an external network connected to it. Alternatively, ILB 20 can be pre-configured to automatically receive primary mastership upon failure of ILB 10. Another alternative is to physically move network segment 80 to port 24 on ILB 20, manually configure ILB 20 to be the primary master, and disconnect ILB 10.

The manner in which the primary master ILBs distribute the incoming loads among the participating ILBs depends on the incoming load and on the workload conditions of the corresponding host servers. For a three-server case as shown in FIG. 1(b), each ILB has three ports to allow load balancing, redundancy, and maintenance of connectivity. The primary master ILBs 10 and 50 distribute the loads coming in from network segments 80 and 90 to ILBs 10, 20, and 50. ILBs 10, 20, and 50 communicate with one another to share their corresponding current workload indices. This communication happens via inter-ILB connection ports 14, 16, 22, 26, 52, and 54 at regular time intervals which can depend on the incoming load arrival rate on network segments 80 and 90. Primary master ILBs 10 and 50 communicate with each other on their load arrival rates to determine the incoming network load. If the incoming network loads on ILBs 10 and 50 are about the same and if the corresponding host servers for ILBs 10, 20, and 50 have similar workload indices (i.e., a workload index ratio of about 1:1:1), then ILBs 10 and 50 will distribute one load unit (e.g., a web object request) to ILB 20 for every two load units they assign to their corresponding servers, so that all three servers handle a similar amount of work. If the incoming network loads on ILBs 10 and 50 are about the same but the corresponding host servers for ILBs 10, 20, and 50 do not have similar workload indices, then the loads are distributed according to the ratio of the workload indices of the servers. For example, if the workload index ratios of the servers corresponding to ILBs 10, 20, and 50 are 2:1:2, respectively, then ILBs 10 and 50 will assign a load to ILB 20 for every four loads they assign to their own corresponding servers, so that all three servers have workload levels proportional to their workload indices. If the incoming network load arrival rates are different for ILBs 10 and 50, then the load distribution again will be dependent on the workload indices of the corresponding host servers.

The use of 3-port ILB modules allows the creation of load-balancing clusters at low cost, since no additional hardware, such as a network switch, is needed. This is important especially when there are only a few servers to be load balanced and an ILB module in each host server can provide the load-balanced cluster solution. When there are only a few servers, the installation of the interconnecting cables among the ILBs is not a significant issue. FIG. 1(d) shows an example of how five ILBs 10, 20, 30, 40, and 50 can be interconnected among themselves and to two external networks via network segments 80 and 90. Six inter-ILB connections 83, 84, 85, 86, 87, and 88 are used to interconnect the five 3-port ILBs. The configuration shown is only one possible arrangement of connections among the ports; many other permutations are possible. Not all of the possible connection configurations are optimal for a chosen load balancing method. Similarly, in the embodiment shown in FIG. 2, twelve 3-port ILBs 202 through 224 are interconnected by sixteen connections and four primary master ILBs 202, 208, 214, and 220 are connected to four external networks via connections 230, 240, 250, and 260. The number of possible permutations of connections among the ports and the number of sub-optimal configurations are far greater in this embodiment. In either case, a technician installing the ILBs may have difficulty in configuring the connections in the most efficient manner for the load balancing method to be used by the ILBs. Therefore, a standard non-load-balancing switch may be used to expedite the interconnection process when several ILBs, e.g., five or more, are present.

Figure 3:
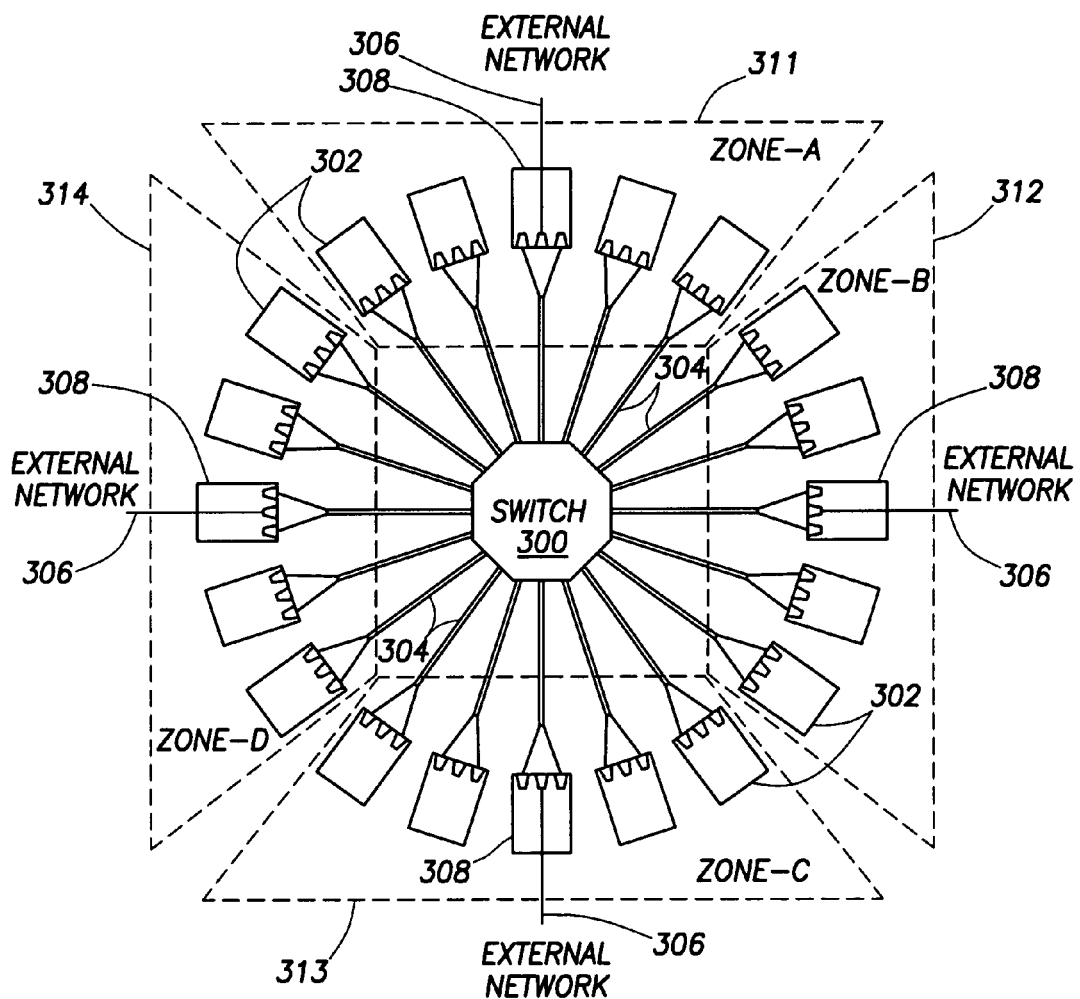
FIG. 3 is a schematic diagram of a large number of load balancing modules interconnected by a network switch.

FIG. 3 illustrates twenty ILBs 302 interconnected with a switch 300 in the center, where each ILB 302 has a redundant connection, or internal network segment, 304 to switch 300. The four external network segments 306 can be two redundant pairs or connections to four independent networks. There are forty redundant connections 304 from the twenty ILBs 302. Thus, a 48-port switch can support this configuration (with four ports still left open). FIG. 3 also illustrates how ILBs 302 can be divided into four zones—Zone A 311, Zone B 312, Zone C 313 and Zone D 314. All load balancing algorithms discussed above can be applied to the switch-connected ILBs.

In the embodiment depicted in FIG. 3, external networks (not shown) are connected directly to ILBs 308 via external network segments 306. ILBs 308 are thus semi-permanently configured to be master ILBs. If the external networks are connected to switch 300 instead of to ILBs 308, the configuration will be more flexible since any of the ILBs 302 can become a master ILB in the event of a failure of another master. The switch 300 needs to be programmed to appropriately route the incoming packets from the external networks to the primary and standby master ILBs 302 over the inbound (to ILB) internal network segments 304. The primary master ILB 302 will then send the packet to its host server, or to another host server over the outbound (from ILB) internal network segment 304, via the switch 300, and over a single or redundant inbound internal network segment 304 connected to the targeted ILB 302.

Note that when an ILB 302 is acting as a slave, the paired segments 304 can carry redundant traffic. In the case where a slave becomes a master, the two network segments 304 coupling each ILB 302 to the switch 300 may no longer be in a redundant configuration, since it will be more efficient to use one network segment 304 for the traffic going from the switch 300 to an ILB 302, and another network segment 304 for the traffic going from an ILB 302 to the switch 300.

In an embodiment of the use of a non-load-balancing switch to connect ILBs, single, non-redundant connections can be made between the ILBs and the switch. While this configuration reduces the complexity of the connections, it does not provide redundancy in the event of a failure of a connection. In another embodiment, multiple switches can be used and each port on an ILB can be connected to a different switch. If one switch fails, connectivity among the ILBs is maintained by the other switch or switches. The multiple switches can be housed in separate physical boxes or can be contained within a single box. Alternatively, a single high-availability switch can be used to perform the functions of multiple switches.

When a switch is used to expedite the connection of a group of ILBs, the port addresses and the interconnection topology of the ILBs within the internal network can be configured by an operator either interactively via a graphical user interface or through the use of a command script. Alternatively, the interconnect topology of the ILBs can be discovered automatically by a topology discovery algorithm similar to the one used to initialize the ILBs when the ILBs are connected directly to each other. The general principles of a suitable topology discovery algorithm are described here.

Before the initial start of a topology discovery algorithm, each ILB has information on its own resources and on the resources of the attached host server. Examples of the attached server's resources include CPU speed, memory size, and disk size. Alternatively, the attached server's resources can be translated to an application-specific throughput metric, such as peak transactions per second. Examples of ILB resources include ILB identification (ID), hardware resource information and ILB throughput information, such as peak requests per second it can process. ILB throughput information can be programmed at manufacturing time based on benchmark test results, or can be adjusted automatically during the use of the ILB. Each ILB also has information on its own network ports, such as number of ports, port addresses, and speed. However, each port on an ILB has no information on where it is connected externally before the topology discovery phase.

At the beginning of the topology discovery algorithm, each ILB will command its individual ports to broadcast a data packet known as a roll-call-1-query packet. Each ILB port will respond to the roll-call-1-query packet with a roll-call-1-response packet that includes information such as its port address, the associated ILB ID, and the associated host server ID. Since this query packet is comprehensible only by a port on an ILB, a port will know whether it is connected to another ILB port, to an external network, or to nothing at all. After this step, each port knows the ID of the port or ports to which it is directly connected. For the topologies shown in FIGS. 1(a) through 1(d) where the ILBs are interconnected directly to each other rather than through a switch, each ILB port knows the other ILB port it is connected to, if any. For example, in FIG. 1(b), ports 12 and 56 know that they are connected to external networks and ports 14, 16, 22, 26, 52, and 54 know that they are connected to the corresponding ports on the other ILBs, i.e., to ports 54, 22, 16, 52, 26, 14, respectively. Port 24 knows it is not connected.

After each ILB receives the roll-call-1-response packet from each port, it will command its ports to send out a roll-call-2-query packet. Upon receipt of the roll-call-2-query packet, a port will respond with a roll-call-2-response packet that includes information about the ILBs that each ILB is connected to. For example, in FIG. 1(b), ILB 10 will receive roll-call-2-response packets from ILB 20 and 50 that contain information on how all the ports on ILB 20 and 50 are connected. ILB 10 therefore has the full topology information on how all the ILBs are interconnected. The same is true for ILB 20 and ILB 50. However, if we apply the same topology discovery algorithm to FIG. 1(c), the port connection information for ILB 50 is not visible to ILB 10 until the roll-call-3-query and roll-call-3-response packets are exchanged. This process will continue until an ILB receives a roll-call-X-response packet that contains the connectivity information on its own ports. For switch-connected ILBs, as in FIG. 3, the discovery process will stop after the roll-call-2-query and response packets have been exchanged among the ILBs. Each ILB maintains the discovered topology information in a linked list. Therefore any ILB can become a master ILB, since each has the full topological map of the internal network.

After the discovery process, ILBs 10 and 50 in FIG. 1(b) know they are ILB masters since ports 12 and 56 on ILBs 10 and 50 connect to external network segments 80 and 90, respectively. If the external network segments 80 and 90 are redundant segments, and if ILBs 10 and 50 are not manually configured for which ILB is to be the primary master ILB, then the ILBs have to negotiate between themselves to determine which will be the primary and which will be the secondary. To accomplish this, ILBs 10 and 50 exchange their resource information; the ILB with higher resources will become the primary ILB master and the other will become the standby ILB master. If ILBs 10 and 50 have the same resource information, then the ILB with fewest hops to reach the other ILBs wins. For example, in FIG. 1(d), ILB 10 can reach ILBs, 20, 30, 40, and 50 with 1, 1, 2, and 3 hops, respectively, whereas ILB 50 can reach ILBs 40, 30, 20, and 10 with 1, 2, 2, and 3 hops, respectively. Therefore, ILB 10 wins to be the primary master ILB. If the number of hops to reach the other ILBs is the same for the competing ILBs then each ILB generates a random number and the ILB with the smallest random number wins the ILB primary master role.

If the external network segments 80 and 90 are not redundant segments, then ILB 10 and 50 will both play the primary master ILB roles, as discussed in the previous paragraphs. ILBs can detect that they are connected to external network segments and prompt the installers to determine whether or not the network segments are redundant.

If the ILBs are connected via a switch, as in FIG. 3, there are likely to be query packet collisions when every ILB port is broadcasting the roll-call-1-query packet. The collisions can be taken care of by an underlying network protocol such as Ethernet CSMA (collision sense multiple access). When an ILB port receives a roll-call-1-query packet, it will respond with a roll-call-1-response packet as described earlier. Thus, every port on an ILB will have information on all the other ports on all the other ILBs. If redundant ports are supported then the topology discovery algorithm can detect that as well.

After the initial topology discovery phase, a topology update system will support changes in the ILB topology in the internal network, such as connecting an ILB port, adding an ILB, disconnecting an ILB port, or removing an ILB. The topology update system may be proactive or reactive. In the proactive topology update system, the primary master ILB will query the participating ILBs' existence by sending roll-call-verify packets at predefined intervals (programmed by the ILB designer and changeable by the system administrator). The roll-call-verify packets are sent to the participating ILBs in the order of the linked list maintained by the master ILB, which will be either in the order of chained connection if the ILBs are interconnected directly to one another as in FIG. 1 and FIG. 2, or in the order of the responses if the ILBs are connected via a non-load-balancing switch as in FIG. 3. Each ILB port also exchanges a heartbeat packet with another ILB port, if they are coupled directly. As long as the heartbeat is present, an ILB port knows the ILB on the other end of a network segment is functional. When the master ILB queries for the roll-call-verify, each ILB will respond with its port statuses as well. This process is designed to discover any ILBs that may have been removed for any reason, e.g., failure or host server maintenance.

The roll-call-verify packets have an address that targets a specific ILB. In the chained internal network as illustrated in FIGS. 1(a) through 1(d), and in FIG. 2, if an ILB receives a roll-call-verify packet with its address then it will respond with a roll-call-verify-response packet to let the primary master ILB know of its existence and functional status. If an ILB receives a roll-call-verify packet with the address of another ILB, it will forward the packet to the appropriate network port, so that the packet will propagate along the internal network chain. If an ILB does not respond to a roll-call-verify packet after a predefined interval, the primary master ILB will consider that ILB to be absent. If a slave ILB detects a roll-call-verify-response packet then it will forward it to the primary master ILB via its appropriate port. In switch-connected topology as shown in FIG. 3, the primary master ILB(s) will send the roll-call-verify packet to each ILB located within its zone, via the switch 300. The slave ILB receiving the roll-call-verify packet will respond with a roll-call-verify-response packet back to the sending master ILB via the switch 300.

In the reactive topology update system, ILBs whose connection status has changed will notify the primary master ILB of the change of state. When an ILB is added, a new network segment is coupled from a port of the new ILB to an open port of an ILB that is already part of the internal network. The new ILB port will then recognize that it is coupled to a new ILB, query the new ILB for its information, and relay the new ILB information (port address, ILB ID, host server ID) to the primary master ILB in a roll-call-addition-request packet. The primary master ILB will send back a roll-call-addition-response packet with approval code, if the primary master ILB can add a new ILB to the internal network. All the other ILBs in the internal network will temporarily keep the new ILB information as the roll-call-addition-request packet passes by their ports. If the primary master ILB successfully added the new ILB, then it will broadcast a roll-call-addition-update packet to all the ILBs about the new ILB, so that their topology map is updated with the new ILB information. If the primary master ILB is too busy when it receives a roll-call-addition-request packet, then it can send a roll-call-addition-response packet with wait code that may include the wait time. The primary master ILB may deny the new ILB addition, in which case it will send back a roll-call-addition-response packet with denial code. If the ILB sending the roll-call-addition-request packet does not get back a response from the primary master ILB within a predefined interval, it will resend the request packet. This process may be repeated a few times, e.g., three, after which the primary master ILB may send a connection-failure packet to the new ILB. After all the ports of the new ILB are successfully connected to the internal network, the primary master ILB will go through the chosen load balancing algorithm methods in exchanging information with the new ILB.

A network segment in the internal network may be physically removed from an ILB, while the ILB still remains in the internal network. To remove an ILB, all its network segments need to be removed from the internal network. Both events will change the load balancing topology within the internal network, and will affect how the primary master ILB distributes loads to the ILBs. When an existing network segment between two ILB ports is disconnected, there will be no be exchange of a heartbeat packet between the ILB ports. In the reactive topology update system, after the loss of heartbeat packet exchange, the ILB port remaining in the internal network will report the event by sending a roll-call-lost packet to the primary master ILB. If this roll-call-lost packet traverses through other ILB ports to get to the primary master ILB, then all the ILB ports that this packet passes through will intercept the disconnected ILB port information. In this manner, all the ILBs will have the updated topology information. The method just described will handle an abrupt disconnect of a network segment from an ILB port.

For a more graceful procedure to remove a host server from the internal network, the system administrator can notify the server's ILB while it is still participating in the internal network. The ILB will issue a roll-call-remove-request packet to the primary master ILB, which will respond with a roll-call-remove-response packet and will stop sending additional loads to the requesting ILB. After the requesting host server finishes processing the load already distributed to it, its ILB sends a roll-call-removed packet to the primary master ILB. If this roll-call-removed packet traverses through other ILB ports to get to the primary master ILB, then all the ILB ports that this packet passes through will intercept the disconnected ILB port information. In this manner, all the ILBs will have the updated topology information. The primary master ILB then responds with the roll-call-removed-acknowledge packet to the requesting ILB, which may turn on visual indicators and signal its host server to notify the system administrator. The host server and its ILB may then be physically removed from the internal network.

When the workload index is consistently low for all the servers, some servers may be selected to be in "sleep" mode to reduce facility power consumption. If the primary master ILB detects a low workload index for all the servers, it sends a roll-call-sleep command packet to the ILBs attached to the servers selected to be in "sleep" mode. After the primary master ILB sends the roll-call-sleep packet to a server, it will not distribute any loads to that server. The primary master ILB adjusts the workload index ratio among the remaining servers accordingly, as described in the adaptive load balancing method. Upon receiving a roll-call-sleep command packet, a server will respond to the primary master ILB with a roll-call-sleep-wait packet. After the server finishes processing its outstanding assigned loads, it will send a roll-call-asleep packet, via its ILB, to the primary master ILB. When the primary master ILB receives the roll-call-asleep packet, it will send a roll-call-asleep-acknowledge packet to the server and the server will go into a sleep mode. However, the ILB of a sleeping server stays awake to route loads passing through the internal network, when necessary, and to communicate with the primary master ILB to later wake up the sleeping server. When the workload index average of the remaining servers exceeds a certain workload threshold, e.g., 75% of their peak workload index, the primary master ILB can wake up one or more servers that are in sleep mode. To wake up a server that was put to sleep, the primary master ILB sends a roll-call-wakeup packet to the ILB that is attached to the sleeping server. The ILB then wakes up the server and responds to the primary master ILB with a roll-call-awaken packet when the server is ready to participate again, i.e., ready to receive loads to be processed. The primary master ILB then readjusts the workload index ratio among all the participating servers and continues with the load distribution. The ability to place servers in sleep mode and the ability to wake them up in a short time to participate in load balancing enables scaling the computer resources while efficiently using the facility power.

In the above descriptions, the servers are traditional server boxes and each ILB is coupled to and physically located within its host server. However, ILBs can be located outside of their corresponding servers. The interface between a server and an ILB located outside of the server may be a USB, 3GIO, Ethernet, or similar interface. A group of ILBs may be implemented within a separate box from the servers, providing a coupling topology similar to a traditional load balancing box. With technology advancements, new form factor servers are emerging, where all crucial server components are implemented on a single printed circuit board. Multiple of these server boards or 'blades' can be physically located within a single box, interfacing with one another via a common printed circuit board backplane. In this environment, ILBs can be implemented on a printed circuit board, either as part of the backplane or as another board plugged into the backplane and coupled to the corresponding server blades.

The algorithms discussed in this invention can be used for any ISO/OSI internetworking layer load balancing, e.g., Network layer (Layer-2), IP layer (Layer-3), Transport layer (Layer-4), or even application layer (Layer-7).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What I claim is:

1. Apparatus for balancing network traffic among a group of servers, comprising:
    a plurality of load balancing modules, each load balancing module (a) associated with a different server and (b) having at least two network ports; and
    an internal network of network segments connecting at least one network port of each load balancing module to a network port of at least one other load balancing module in said plurality of load balancing modules, and coupling every load balancing module, directly or through one or more load balancing modules, to each of the other load balancing modules,
    at least one of said load balancing modules having a network port coupled to an external network;
    wherein said load balancing modules are configured in a plurality of zones, each zone comprising a master load balancing module and one or more slave load balancing modules, each master load balancing module balances loads by selecting, from among its own server and servers coupled to its one or more slave load balancing modules, a server to handle a network request; and
    wherein, if its associated server fails or becomes disconnected, each load balancing module continues to balance loads by transferring a received network request to another load balancing module.

2. Apparatus according to claim 1, wherein:
two load balancing modules have a network port directly coupled to said external network.

3. Apparatus according to claim 1, wherein:
said plurality of load balancing modules comprises two load balancing modules,
each of said two load balancing modules has two network ports,
one of said two network ports of each load balancing module is coupled directly to said external network, and
the other of said two network ports of said load balancing modules are coupled together.

4. Apparatus according to claim 1, wherein:
said plurality of load balancing modules comprises at least three load balancing modules,
each of said load balancing modules has three network ports, and
two of said load balancing modules have one network port coupled directly to said external network.

5. Apparatus according to claim 1, wherein:
said at least one load balancing module is directly coupled to the external network and receives external network messages and routes messages to its own server or through said internal network to servers coupled to said other load balancing modules according to a priority system.

6. Apparatus according to claim 5, wherein:
said priority system is based on workload levels of said servers.

7. Apparatus according to claim 5, wherein:
said priority system is based on workload capacities of said servers.

8. Apparatus according to claim 5, wherein:
each module monitors workload conditions of the server to which it is coupled and communicates said conditions to other modules.

9. Apparatus according to claim 5, wherein:
two load balancing modules are directly coupled to the external network and each is adapted to receive network messages and route messages to its own server or through said internal network to servers coupled to said other load balancing modules according to a priority system.

10. Apparatus according to claim 9, wherein:
said two directly external network coupled modules receive redundant external network messages,
a first of said two directly external network coupled modules routes messages to its own server or through other load balancing modules to servers coupled to said other load balancing modules according to a priority system, and
if said first of said two directly external network coupled modules fails to operate correctly, a second of said two directly external network coupled modules routes messages to its own server or through said internal network to servers coupled to said other load balancing modules according to a priority system.

11. Apparatus according to claim 1, further comprising:
means in each load balancing module for sending messages to and receiving messages from other load balancing modules through said internal network.

12. Apparatus according to claim 11, further comprising:
means in each module for identifying the topology of the internal network.

13. Apparatus according to claim 12, further comprising:
means in each load balancing module for detecting a change in the topology of the internal network and sending a message identifying said change over said internal network to other load balancing modules.

14. Apparatus according to claim 13, further comprising:
means in each load balancing module for storing a map of said topology, and means for routing a message to a selected load balancing module by the shortest path through said internal network.

15. Apparatus according to claim 14, further comprising:
means in each load balancing module for updating said map of said topology in response to changes detected in said topology.

16. Apparatus according to claim 1, further comprising:
a switch having a plurality of ports,
at least one of said switch ports coupled to at least one port of each of said plurality of load balancing modules,
whereby said plurality of load balancing modules are coupled together through the switch to form said internal network.

17. Apparatus according to claim 16, wherein:
at least one switch port is coupled to said external network.

18. A method for balancing network loads directed to a group of servers, comprising:
using a group of load balancing modules arranged into zones, each load balancing module within a given zone integrated within a different server in said group of servers and through an internal network to each of the other load balancing modules within the given zone, to couple external network messages to each server, each zone comprising a master load balancing module and one or more slave load balancing modules,
using a master balancing module within a zone to receive an external network message and balance loads within that zone by routing the message through said internal network to a server selected according to a priority system; and
even if its server fails or becomes disconnected, each load balancing module continuing to balance loads by transferring a received network request to another load balancing module.

19. The method of claim 18 further comprising:
routing the message to the server to which said first of said load balancing modules is coupled.

20. The method of claim 18, further comprising:
routing the message through said internal network and one or more of said other load balancing modules to a server other than the server to which said first of said load balancing modules is coupled.

21. The method of claim 18, further comprising:
coupling workload capacity and level information from each of said servers through said internal network and said load balancing modules to said first of said load balancing modules.

22. The method of claim 21, further comprising:
using workload capacity information to selectively route network messages to said servers.

23. The method of claim 21, further comprising:
using workload level information to selectively route external network messages to said servers.

24. The method of claim 23, further comprising:
upon detection of a low workload level, selectively deactivating one or more servers and routing all external network messages to other servers.

25. The method of claim 24, further comprising:
upon detection of an increased workload level, selectively reactivating a previously deactivated server.

26. The method of claim 18, further comprising:
assigning an order to said group of load balancing modules and sequentially routing said messages to said modules in accordance with said order.

27. The method of claim 18, further comprising:
automatically detecting the topology of said internal network.

28. The method of claim 27, further comprising:
transmitting a roll call query message from each port of each load balancing module.

29. The method of claim 28, further comprising:
in response to receipt of a roll call query message at a first load balancing module port, transmitting a roll call response identifying the first load balancing module, the port from which the response is sent, and other ports of said first load balancing module.

30. The method of claim 29, further comprising:
transmitting a roll call response identifying other load balancing modules to which ports of said first load balancing modules are coupled.

31. The method of claim 30, further comprising:
storing a map of said topology in each load balancing module, and using said topology to route network loads.

32. The method of claim 31, further comprising:
detecting changes in said topology and updating said map.

33. The method of claim 32, further comprising:
sending a query over said internal network from said first of said load balancing modules to each of the other of said load balancing modules to verify network topology.

34. The method of claim 32, further comprising:
detecting in each load balancing module a change in topology and sending over the internal network a message to said first of said load balancing modules indicating the change.

35. The method of claim 34, further comprising:
changing the topology map stored in said first of said load balancing modules to reflect the change, and
transmitting a message over said internal network from said first of said load balancing modules to each of the other of said load balancing modules to update the topology map stored in each of said other of said load balancing modules.

36. A system for load balancing network loads among a group of servers, comprising:
a group of load balancing module means, one integrated within each server in the group of servers, for receiving an external network message and coupling the message to the server to which it is coupled or to another load balancing module means in accordance with a priority system;
means for enabling each load balancing means to continue operating if said server fails in which said load balancing means is integrated, the load balancing means continues operating by transferring a received network request to another load balancing module; and
priority means for selecting a server which is to receive the next external network message.

37. The system of claim 36, further comprising:
load reporting means in each load balancing module for monitoring network loading of the server to which the module is coupled and coupling the loading information to other load balancing modules.

38. The system of claim 37 wherein:
the priority system is based on the level of loading of servers.

39. The system of claim 38, wherein:
the priority system is independent of the network protocol layer type.

40. The apparatus of claim 1 wherein a master load balancing module from a first zone interrogates a master load balancing module of a second zone when the first zone reaches a predefined saturation level.

* * * * *

UNITED STATES PATENT AND TRADEMARK OFFICE
CERTIFICATE OF CORRECTION

PATENT NO. : 7,284,067 B2
APPLICATION NO. : 10/079359
DATED : October 16, 2007
INVENTOR(S) : Kevin B. Leigh It is certified that error appears in the above-identified patent and that said Letters Patent is hereby corrected as shown below:

In column 1, line 37, delete "modem" and insert -- modern --, therefor.

In column 15, line 22, delete "intemetworking" and insert -- internetworking --, therefor.

Signed and Sealed this

First Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,284,067 B2 Page 1 of 1
APPLICATION NO. : 10/079359
DATED : October 16, 2007
INVENTOR(S) : Kevin B. Leigh It is certified that error appears in the above-identified patent and that said Letters Patent is hereby corrected as shown below:

In column 1, line 37, delete "modem" and insert -- modern --, therefor.

In column 15, line 22, delete "intemetworking" and insert -- internetworking --, therefor.

Signed and Sealed this

Eighth Day of July, 2008

JON W. DUDAS
*Director of the United States Patent and Trademark Office*